US007475521B2

(12) United States Patent (10) Patent No.: US 7,475,521 B2
Töpfer (45) Date of Patent: Jan. 13, 2009

(54) CLIP REEL AND SYSTEM FOR UNWINDING A CLIP REEL

(75) Inventor: Klaus Töpfer, Büttelborn (DE)

(73) Assignee: Poly-Clip System GmbH & Co. KG (DE)

( * ) Notice: Subject to any disclaimer, the term of this patent is extended or adjusted under 35 U.S.C. 154(b) by 434 days.

(21) Appl. No.: 11/419,873

(22) Filed: May 23, 2006

(65) Prior Publication Data

US 2007/0012813 A1 Jan. 18, 2007

(30) Foreign Application Priority Data

Jul. 12, 2005 (DE) ........................ 10 2005 032 530

(51) Int. Cl.
*B65B 57/00* (2006.01)
*B65B 51/04* (2006.01)
*A22C 11/12* (2006.01)
*B65H 23/00* (2006.01)

(52) U.S. Cl. .......................... 53/75; 53/138.4; 242/566; 452/48; 29/243.56

(58) Field of Classification Search ...................... 53/75, 53/138.1–138.4, 417; 206/390; 242/602.2, 242/566, 615.3, 614, 563.2, 564.5, 171; 29/243.56, 29/243.57; 452/48; *A22C 11/12; B65B 51/04*
See application file for complete search history.

(56) References Cited

U.S. PATENT DOCUMENTS

| 2,118,136 | A | * | 5/1938 | Bardsley | ................... | 242/441.4 |
| 2,341,347 | A | * | 2/1944 | Weber et al. | ............. | 29/243.56 |
| 2,769,978 | A | | 11/1956 | Berluti | | |
| 2,824,705 | A | * | 2/1958 | Bowman | .................... | 242/566 |
| 3,400,897 | A | * | 9/1968 | Guernet | ..................... | 242/614 |
| 3,547,370 | A | * | 12/1970 | Karl et al. | ................ | 242/615.3 |
| 3,707,275 | A | * | 12/1972 | Arnold | ..................... | 242/615.3 |
| 3,777,400 | A | | 12/1973 | Klenz et al. | | |
| 3,960,340 | A | * | 6/1976 | Naas | .......................... | 242/614 |
| 4,224,731 | A | * | 9/1980 | Lingle | ..................... | 29/243.56 |
| 4,428,176 | A | * | 1/1984 | Burrell | ...................... | 53/138.4 |

(Continued)

FOREIGN PATENT DOCUMENTS

CH            509 043          8/1971

(Continued)

OTHER PUBLICATIONS

EP06010918 Search Report.

*Primary Examiner*—Stephen F Gerrity
(74) *Attorney, Agent, or Firm*—Hahn Loeser & Parks LLP; Michael H. Minns (57) ABSTRACT

A reel for a winding comprising a clip line having openings, with a reel body and a connecting element which is arranged rotatably about the reel body and captively on the reel body and which has a guide for guiding the clip line in the unwinding operation. It further concerns a system for unwinding such a clip line from the reel with a mounting element which defines an operative position for the reel in which it is rotatably supported, and an advance device which is associated with the mounting element and which is adapted to engage the clip line in the region of the connecting element when the reel is in its operative position. It further concerns a clip machine having such a mounting element and advance device.

32 Claims, 5 Drawing Sheets

U.S. PATENT DOCUMENTS

| | | | |
|---|---|---|---|
| 4,709,627 A * | 12/1987 | Staszko | 100/30 |
| 4,811,545 A | 3/1989 | Oxman | |
| 6,871,474 B2 | 3/2005 | Töpfer | |
| 6,883,297 B2 * | 4/2005 | Kirk et al. | 53/138.2 |

FOREIGN PATENT DOCUMENTS

| | | |
|---|---|---|
| DE | 1 094 180 | 12/1960 |
| DE | 2 241 544 | 1/1973 |
| DE | 23 42 519 A1 | 3/1975 |
| DE | 24 10 332 A1 | 9/1975 |
| DE | 101 31 807 C1 | 11/2002 |
| EP | 1 428 760 A1 | 6/2004 |
| GB | 883774 | 12/1961 |

* cited by examiner

CLIP REEL AND SYSTEM FOR UNWINDING A CLIP REEL

This patent application claims priority to German patent application DE 10 2005 032 530.0-27, filed Jul. 12, 2005, hereby incorporated by reference.

TECHNICAL FIELD

The invention concerns a reel for a winding comprising a clip line having openings, with a reel body. It further concerns a system for unwinding a winding comprising a clip line having openings, with such a reel having a reel body, and it concerns a clip machine with a mounting means for such a reel with a reel body.

BACKGROUND OF THE INVENTION

Known windings or supply windings or rolls of the specified kind generally comprise a wound-up metal line or train (generally of aluminum wire) which is stamped to constitute a corrugated configuration and which by virtue of the stamping forms respective clips which are integrally interconnected at their limb ends. As is known, unwinding of the line of clips from the reel body which carries the winding thereof, which is unwanted by virtue of elastic stress, is prevented by an adhesive strip which is fixed to the end which is exposed in the unrolling direction of the clip line, and the adjoining turns of the winding and/or the reel body. Removal of the adhesive strip prior to feeding the clip line to the clip machine is frequently laborious and residues of the adhesive strip which have remained behind can lead to troubles in the clip machine.

Clip machines of the stated kind (also referred to as closure apparatuses or automatic closure devices) are typically used to close bags or packagings in tubular form (artificial tubular case or natural skin) filled with liquid to pasty or also (in part) granular content by means of closure tools. For that purpose the clips in the form of the line thereof are fed to the closure tools along a predetermined guide path, starting from the clip reel. Equipping the clip machine with such a reel and introducing the clip line and feeding it to the machine in that way is in that case generally very laborious.

SUMMARY OF THE INVENTION

In one embodiment, the present invention provides a reel, a system and a clip machine of the kind set forth in the opening part of this specification, which requires a lower level of expenditure and complication when equipping the clip machine with such a reel and introducing and feeding the clip line thereto and which in that case is at the same time less susceptible to trouble.

In an embodiment of a reel of the kind in accordance with the invention, a connecting element is arranged on a reel body captively but rotatably about the reel body. The connecting element has a guide means for guiding the clip line in the unwinding operation. If the clip line is introduced for example with its free end into the guide means with the reel in the condition as delivered therefore both the axial and also the radial position of that end of the clip line is fixed and accurately defined. That affords a reference point for the engagement of an advance device on the clip line.

Only the angular position of the connecting element and thus the clip line which is passed through the guide means is variable with respect to the reel body so that the reel body can rotate through beneath the connecting element when the clip line is unwound.

In a system for unwinding a wound-up clip line, there is also provided a mounting means which defines an operative position for the reel, in which the reel is rotatably supported, and an advance device which is associated with the mounting means and which is adapted to engage the clip line in the region of the connecting element when the reel is in its operative position on the reel mounting means.

For that purpose the mounting means may have for example a spindle or shaft which at least partially centrally passes through the reel in the operative position thereof. For equipping the clip machine therefore the reel is for example fitted on to the stub of such a shaft. In accordance with an alternative embodiment the mounting means may have at least two guide rollers which in the operative condition of the reel bear against same in peripheral relationship. There are preferably three such guide rollers so that the position of the reel is clearly defined. In a particular configuration, the mounting means (that is to say either the spindle or at least one of the guide rollers) is motor-drivable so that the reel can possibly be wound up again.

In that way the advance device can engage the clip line in a defined manner by virtue of the connecting element which provides a radial and also an axial reference point and by virtue of the defined position of the reel in its operative position, and that permits an increased degree of automation. It is only necessary to pay attention to the angular position of the connecting element when fitting the mounting means with the reel.

In an embodiment of the clip machine according to the invention with a corresponding mounting means and an associated advance device use of the reel according to the invention nonetheless results in the work involved being made considerably easier and affords an elevated level of process reliability as for example any operation of cleaning residues of an adhesive strip from the winding is eliminated and in particular it is possible to substantially or completely dispense with the manual procedure for introducing the free end of the clip line and passing it through the guide path provided for same in the clip machine towards the closure tools.

In an embodiment of the reel, the connecting element has a holding means which engages the clip line for holding the clip line or the free end thereof. The holding means in an operative position holds the clip line and in a release position releases the clip line for unwinding. That measure ensures that the clip line cannot slide by virtue of its elastic properties unintentionally out of the guide means of the connecting element in the tangential direction, that is to say in or in opposite relationship to the draw-off direction, for example when transporting the reel or when fitting the reel to the mounting means, when the holding means is in the operative position.

In an embodiment of the system according to the invention, the advance device has a first actuating means which is adapted to control transfer of the holding means from the operative position thereof into the release position thereof when the advance device engages the clip line, when therefore the reel is in its operative position. More specifically the advance device then performs the function of the holding means of the connecting element and holds the clip line firmly in a defined tangential position.

In one embodiment of the invention, the holding means has a brake which in the operative position of the holding means bears in frictionally locking relationship against the clip line. In another embodiment, the holding means has a projection which in the operative position of the holding means engages into an opening in the clip line. That permits a still further improvement in the definition of the position of the clip line which now is also defined precisely in respect of its tangential position down to the pitch division of its openings when the reel is in its operative position on the mounting means.

In one embodiment of the system, the advance device has an entrainment element which engages into an opening in the clip line when the reel is in its operative position.

In another embodiment of the invention, the entrainment element and the first actuating means are so arranged that the entrainment element engages into the opening in the clip line while the first actuating means transfers the holding means from the operative position into the release position, so that no play can occur at the moment of transfer of the clip line from the holding means of the connecting element to the entrainment element of the advance device. If engagement of the advance device with the clip line is implemented in that way, the clip line is transferred to the advance device without surrendering the improved definition in terms of the position thereof. That permits very substantially completely automated and precise feed for the clip line.

Preferably the reel body of the reel according to the invention has at least one flange on which the connecting element is arranged. In an advantageous development of the reel according to the invention the connecting element has a clamping device having an operative position and a release position, with which device the connecting element engages the flange in the operative position thereof, in its release position the clamping device releasing the connecting element for rotation about the flange.

A reel having one or two flanges is advantageous as the clip line can be prevented from axially jumping or slipping off the reel body during transport or also while the mounting means is having the reel fitted thereto. In accordance with the invention however the flange or flanges are suitable at the same time for the rotatable and captive arrangement of the connecting element. In that respect the clamping device can advantageously provide that the angular position of the connecting element with respect to the reel body can also be established, in the operative position thereof. That in turn simplifies handling of the reel when fitting the reel to the mounting means of the system according to the invention or the clip machine according to the invention.

In one embodiment of the system, the advance device also has a second actuating means which is adapted to control transfer of the clamping device from the operative position thereof into the release position thereof when the advance device engages the clip line, when therefore the reel is in its operative position. In that way the fixing of the connecting element on the reel body is released and thus the reel body is allowed to rotate as soon as the reel was moved into its defined operative position and thus the clip line was 'transferred' from the holding means to the advance device.

In alternative embodiments it is not the connecting element that is mounted rotatably about the flange of the reel, but the flange itself is mounted rotatably about a reel core of the reel body. It is further possible to provide on the reel body a carrier such as for example a cantilever arm or the like to which the connecting element is fixed.

The captive nature of the connecting element is preferably ensured by the flange having a gripping edge and the connecting element a complementary gripping profile. That can be for example in the form of a profile at the outer edge of the clip reel flange with an undercut configuration, a ridge, a peripherally extending groove or the like, and a complementary undercut configuration in the profile of the connecting element, which embraces that outer edge.

In the system according to the invention it is further found to be advantageous if the advance device has a motor connected to the drive roller or the entrainment element and an advance control means which is coupled to the motor and which is adapted to draw the clip line off the reel when the reel is in its operative position. That implements the above-mentioned high degree of automation which reduces the time-consuming clip reel change operation down to inserting a new clip reel into the mounting means. More specifically that therefore makes it possible to dispense with manual actuation of the clip reel or drawing off the clip line from the clip reel for the purposes of threading the line in.

A clip machine according to the invention having a mounting means and an advance device, as described hereinbefore, preferably also has a clip machine control means which is connected to the advance control and adapted to output a clip advance control signal to the advance device, wherein the advance device is adapted upon receipt of the clip advance control signal to drive the motor of the advance device (intermittently or continuously) in the draw-off direction of the clip line. The motor of the advance device can be a stepping motor or an electric dc or ac motor of another kind.

In an embodiment of the invention, the clip machine control means is connected to the advance control means and adapted to output a production end control signal to the advance control means, which in turn is adapted upon receipt of the production end control signal to drive the motor of the advance device by a predetermined number of revolutions in opposite relationship to the draw-off direction of the clip line, which number of revolutions approximately corresponds to the length of the extended clip line from the connecting element to a closure tool of the clip machine.

Conversely the clip machine control means may be adapted to output a production start control signal to the advance control means, which in turn is adapted to drive the motor of the advance device upon receipt of the production start control signal by the predetermined number of revolutions in the draw-off direction of the clip line, which number of revolutions approximately corresponds to the length of the extended clip line from the connecting element to the closure tool in the clip machine. In that respect actuation or control of the motor of the advance device is preferably additionally effected with the proviso that the reel is in its operative position, which condition can be verified by sensor interrogation and suitable signalling to the advance control means.

In one embodiment, the advance control means has a clip end monitoring device which is adapted to produce a machine stop control signal and to output same to the clip machine control means when a last clip of the wound-on clip line passes through the advance device. The clip end monitoring device can be of different configurations, respectively depending on whether the advance device is or is not driven in normal clip operation. If the advance device is continuously driven in normal clip operation and provides for an assisting drive for the clip line in the draw-off operation, in which case however the clip line is necessarily removed in the cycle of the closure operation and fed to the closure tools, the clip end can be detected as soon as the drive of the advance device goes into a non-loaded condition, that is to say virtually no more torque demand is required therefrom. If in contrast the advance device is not driven in normal clip operation (while it is nonetheless drivable for the purposes of introducing the clip line and pulling it back) and runs only passively, driven by the clip line which is pulled off in some other fashion, the clip end is detected as soon as the advance device stops after the last clip has passed it.

Further features and advantages of the reel according to the invention, the system according to the invention and the clip machine according to the invention are set forth in the appendant claims.

DETAILED DESCRIPTION OF THE DRAWINGS

Figure 1:
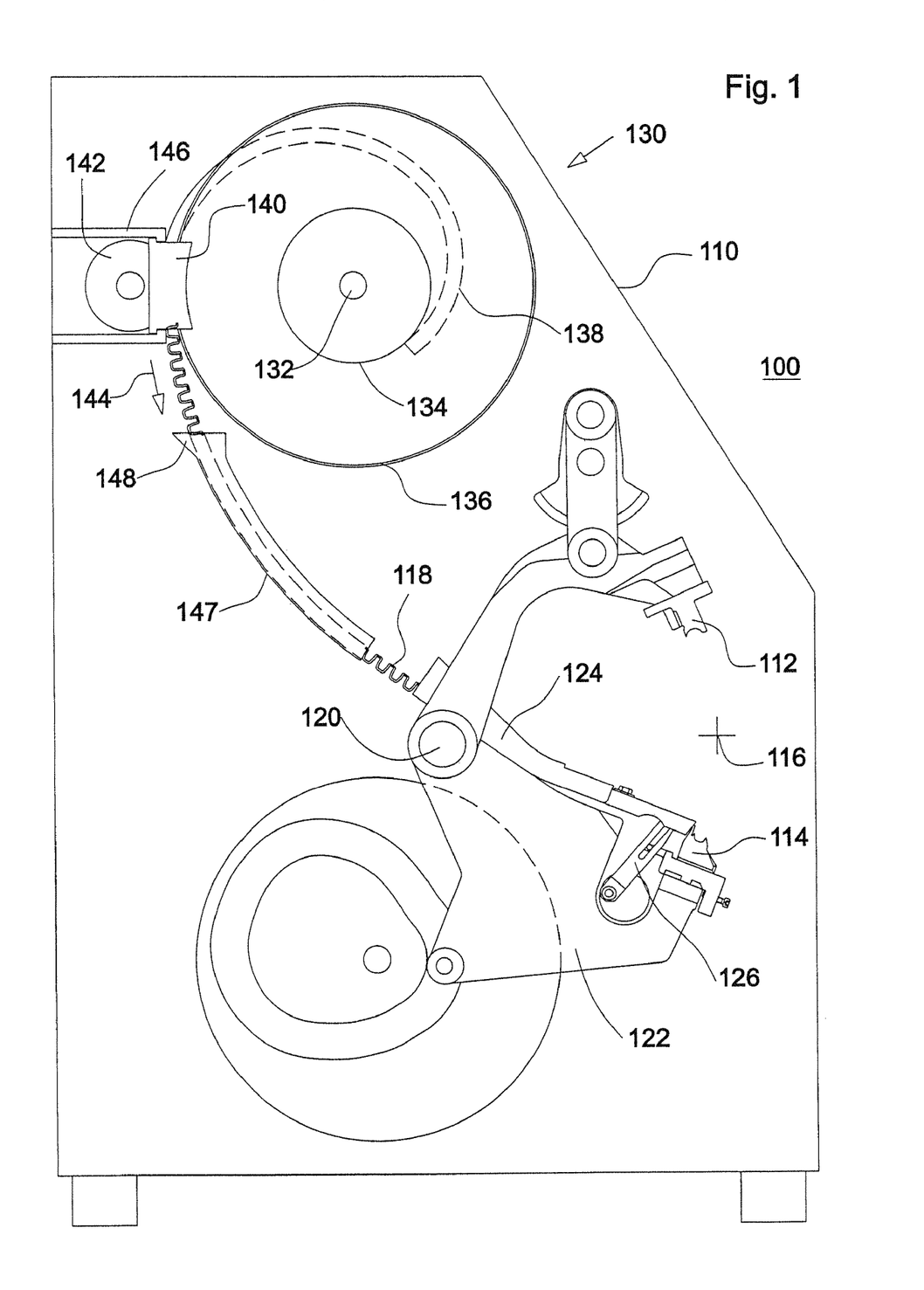
FIG. 1 is a diagrammatic view of an embodiment of the clip machine according to the invention.

The clip machine 100 according to the invention is shown in FIG. 1 in a state of being reduced to its elements which are essential to the invention. In the interior of its housing 110 the clip machine has two clip tools 112 and 114 which are movable relative to each other. They move towards a common center 116 which is typically defined by the axis of the tube of a packaging material to be closed. The closure element (clip) which is to be closed around a tubular plaited end portion previously formed by constriction by displacement elements (not shown) of the clip machine 100 is fed to the lower closure tool 114 in the form of a virtually endless clip line 118 of a corrugated configuration. For the purposes of feeding the clip line therefore the lower closure tool 114 is fixed to a lever arm 122 which is mounted about a pivot shaft 120 and which has a guide 124 which begins near the pivot shaft 120. The guide 124 opens into the closure tool 114 which in the illustrated case is a female die. The corresponding upper closure tool 112 is a male die. The closure tools perform two functions when they move towards each other: firstly the foremost clip is severed from the following clip line 118 and it is thereafter deformed around the tubular plaited end portion until the latter is fixedly closed.

Arranged at the lower clip lever 122 in the region of the front end of the guide path 124 is an intermittently engaging conveyor mechanism 126 which engages the clip line by means of a finger, lifts the clip line, advances it and in that way, in synchronous relationship with the closure operation, inserts the respective foremost clip into the female die 114.

A clip feed system 130 according to the invention is arranged in the machine housing 110. The system 130 includes a mounting means 134, arranged on a shaft 132, for a reel 136 according to the invention. The reel 136 carries a supply roll or winding 138 of the clip line which is being processed in the clip machine 100.

At the external periphery the clip reel 136 has a connecting element 140 which is captively connected to the reel body and arranged rotatably about same. The clip line 118 is guided through that connecting element 140, as will be described in greater detail with reference to FIGS. 2 through 5. In the region of the connecting element 140 an advance device, more precisely a rotational body 142 of the advance device having a plurality of entrainment elements, engages the clip line. Rotation of the rotational body 142—in the clockwise direction in the view shown in FIG. 1—therefore causes the clip line 118 to be conveyed in the draw-off direction, identified by the arrow 144, in the direction of the lower closure tool 114. On the way to the guide 124 disposed at the lower closure lever 122, the clip line is further guided by a second guide 147 and is thus guided on a path defined over substantially the entire distance from the connecting element 140 to the closure tool 114.

The control means according to the invention of the advance device provides that the rotational body 142 is rotated in the clockwise direction by means of a motor (not shown) of the advance device through a given number of revolutions and in that situation causes the clip line to be unwound from the clip reel 136. The number of revolutions is determined by the distance from the connecting element 140 to the lower closure tool 114 along the defined path from the connecting element 140 to the closure tool 114.

In order to be able to unwind the clip line as accurately as possible as far as the lower closure tool 114, the position of the clip line or the free end thereof must firstly be known, with respect to the advance device 142. That is made possible by the connecting element 140 if in accordance with the invention it has a holding means which engages a predetermined location of the clip line. Preferably for that purpose the holding means has a projection which engages into an opening in the clip line, which is spaced from the front free end thereof by a counted-off number of openings or by a predetermined distance, as will be described hereinafter with reference to FIGS. 2 through 5.

Determining the position of the free end of the clip rod, with a degree of accuracy which is therefore down to an individual clip, and precisely knowing the length of the path from the connecting element 140 to the closure tool 114, make it possible for example after a change in the clip reel for a clip line which is new at the beginning of a new production cycle to be fed completely automatically to the closure tool. The operation of threading in the new clip line can also be effected by means of a funnel-shaped insertion aid 148 on the second guide 147 without involving manual intervention.

The rotational element 142 of the advance device can be driven by the drive motor in the reverse direction in order to pull the clip line 118 back out of the clip machine until the front free end of the clip line has been pulled back into the connecting element 140, to the same predetermined length. In accordance with the invention that is effected after the receipt of a corresponding production end signal outputted by a clip machine control means (not shown) to the control means of the advance device 142. The clip reel 136 with the remaining clip supply 148 thereon can then be removed and replaced for example by a new clip reel 136 with a clip of a different size and a new production cycle can be started.

To withdraw the clip line 118 from the clip machine 100 it is also necessary to actively rotate the reel 136 so that the clip line which has been pulled back can be wound thereonto again. That is preferably effected by a motor drive for the mounting means 134. That drive can take place in synchronised relationship or with (adjustable) slip.

While the advance device is drivable in the above-described manner for the purposes of introducing the clip line 118 and withdrawing it, after or before the clip machine has been fitted with a reel 136, it can either be actively driven in the normal mode of clip operation, or it can only passively run along with the advance effect being produced solely by the conveyor mechanism 126. If it is not driven it can serve as a clip counter and/or as part of a clip end monitoring device can detect the end of the clip line by registering the fact that it is stationary after the last clip has passed.

If it is also driven in normal clip operation that can be continuous or intermittent. A continuous drive only has a supporting action when drawing off the clip line as the clip line must necessarily be drawn off by the conveyor mechanism 126 in the cycle of the closure operation, and fed to the closure tools. In that case the end of the clip line can be detected by means of the advance control means as soon as the drive of the advance means runs in an empty or non-loaded condition because the guided clip line held by the finger of the conveyor mechanism 126 no longer opposes any resistance thereto, that is to say there is no longer any demand for torque. An intermittent drive for the advance device in the cycle of the clipping operation can produce an advance movement in fully synchronised relationship jointly with the conveyor mechanism 126 by means of the advance control means or can partially replace the conveyor mechanism 126. In the latter case it is solely the operation of lifting the clip line 118 upstream of the female die 114 for the purposes of introducing the leading clip into the female die 114 that is effected in synchronised relationship. In that case the end of the clip line can be detected in another fashion (for example optically by means of a light barrier arrangement or the like).

With the information in respect of the end of the clip line and knowledge about the length of the path from the connecting element 140 to the closure tool 114 or the number of remaining clips, the advance control means can produce a machine stop control signal and output it to the clip machine control means which then stops the clip machine after a number of cycles corresponding to the number of remaining clips, and signals for example the end of the supply of clips to the operating personnel.

In order to simplify the operation of fitting the clip reel 136 into place and to align the connecting element 140 in respect of its angular position with the advance device or in the illustrated situation with the rotational element 142 the clip feed system 130 has an installation shaft with a pocket 146 in the region of the advance device, the contour thereof being complementary at least in portion-wise manner to that of the connecting element. The pocket 146 is arranged fixedly with respect to the machine housing 110 and thus with respect to the guide 147, the mounting means 134 and the advance device. It is of such a size that the connecting element 140 is aligned with the rotational element 142 with the necessary (fitting) accuracy after insertion of the reel. It also engages behind the connecting element 140 at an edge so that, when the rotational element 142 engages into the connecting element 140, a radially inwardly acting force is passed to the machine housing 110 not by way of the reel 136 but by way of the pocket 146.

Figure 2:
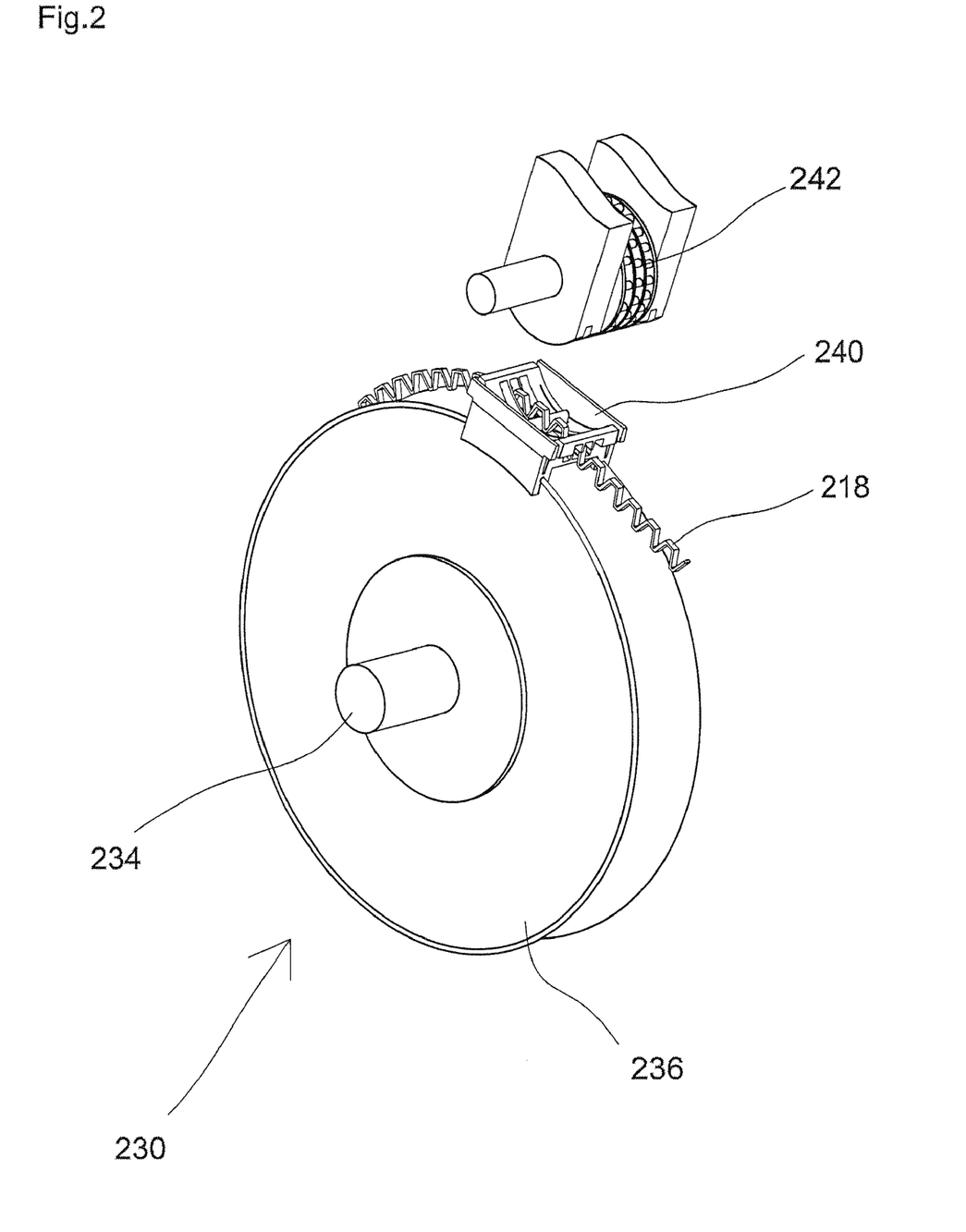
FIG. 2 shows a perspective view of an embodiment of a system according to the invention comprising a reel, a mounting means for the reel and an advance device.

FIG. 2 shows a perspective view of the system according to the invention (clip feed system) for unwinding a wound-up clip line. The system 230 includes the mounting means which in this embodiment is in the form of a shaft or spindle stub 234, depending on whether it is or is not driven. That shaft or spindle stub 234 passes centrally through the reel 236 and thus defines the radial position of the connecting element 240 arranged in peripheral relationship at the outer edge of the reel. In addition the axial position of the reel in the operative position thereof can be defined by the shaft or spindle stub or the mounting means preferably having an abutment for the reel body 236 at another location. Alternatively the shaft or spindle stub can be of a conical configuration so that a correspondingly also conical mounting bore in the reel body 236 predetermines the axial end position. In that axial end position, the connecting element 240 is so arranged that an advance device 242 associated with the mounting means 234 can engage the clip line 218 precisely at the location of the connecting element 240. The spatial association between the mounting means 234 and the advance device 242 is effected by way of the installation shaft shown in FIG. 1, with a pocket, or another structural element such as for example a common frame of the clip feed system, which is matched to the dimension of the reel with connecting element.

The advance device 242 or more precisely the rotational body thereof is shown in FIG. 2 in spaced relationship with the connecting element 240 and thus the clip line 218 which is guided through the connecting element 240. That situation is found while the clip reel 236 is being fitted on to the mounting means 234. When the clip reel has assumed its operative position the advance device or the rotational body 242 is moved into its operative position on the clip line 218, that is to say partially into the connecting element 240. That is effected manually or preferably in automatically controlled fashion. In the latter case the advance control means has for example a position sensor for detecting the operative position of the reel and a drive for lateral displacement of the rotational body.

Figure 3:
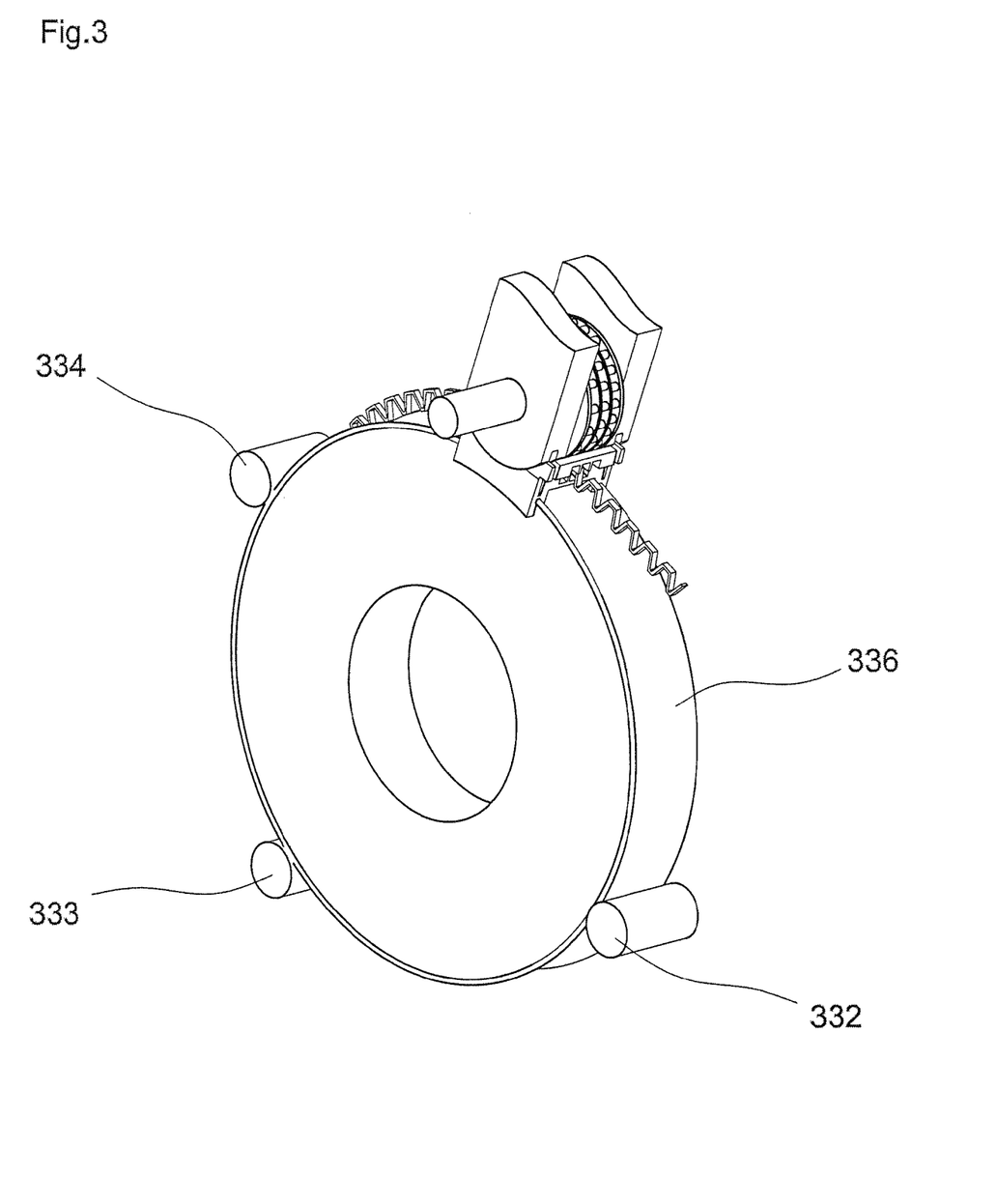
FIG. 3 shows a second embodiment of the system according to the invention with another reel mounting means.

FIG. 3 shows another embodiment of the mounting means of the clip feed or clip unwinding system according to the invention. In accordance therewith the mounting means comprises three guide rollers 332, 333, 334 which in the operative condition of the clip reel 336 bear against the periphery thereof and thus clearly determine the radial position thereof. Once again the axial position of the clip reel 336 can be defined in the operative condition thereof by an abutment (not shown). One, two or all three guide rollers can be driven actively, that is to say by motor means.

Figure 4:
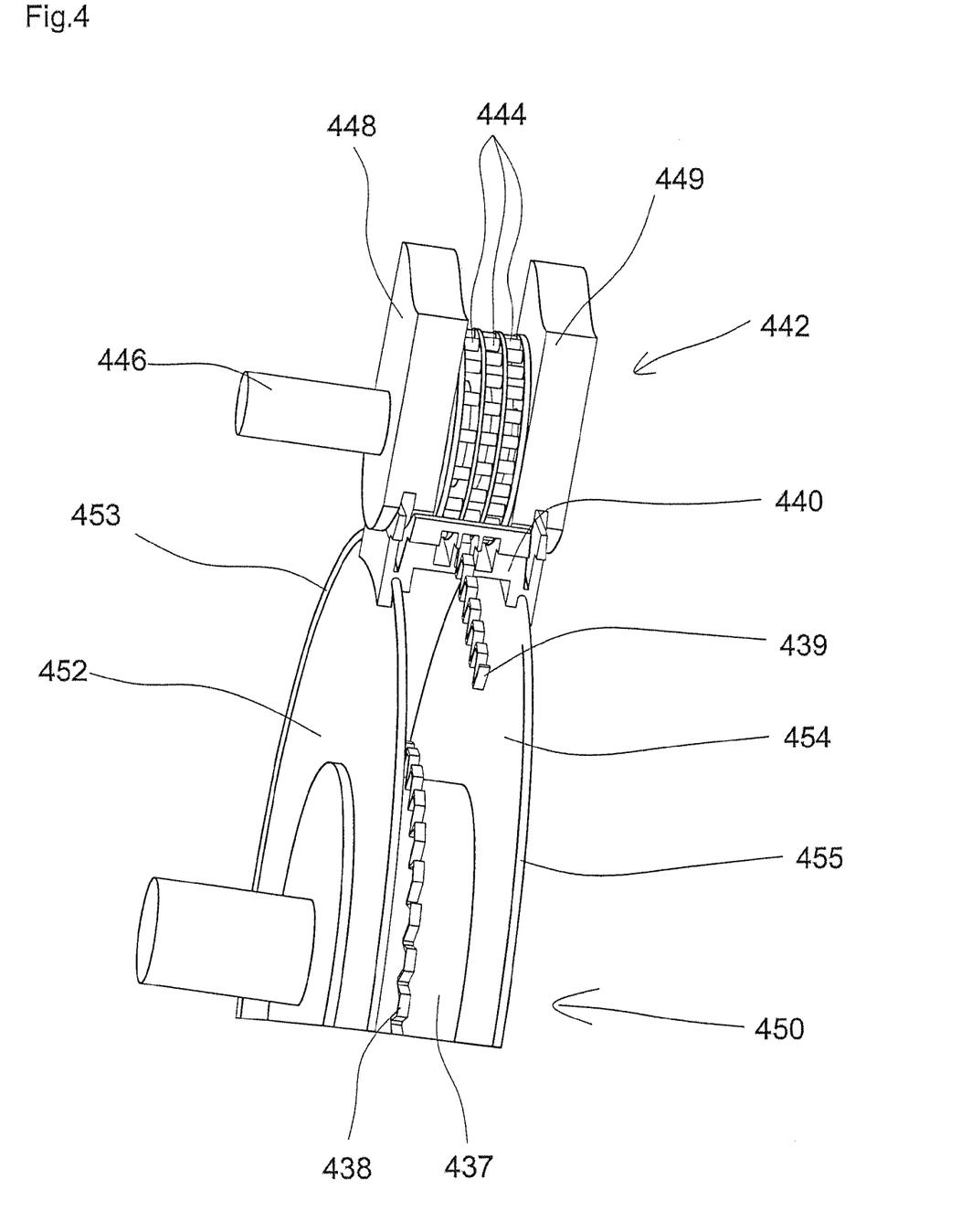
FIG. 4 shows a detail view of the first embodiment of the system according to the invention in the operative condition.

FIG. 4 shows a detail view of the rotational body 442 which has been moved into the connecting element 440 as well as a more detailed view of the reel body 450. The reel body 450 has two laterally defining flanges 452, 454. The winding of the clip line 438 is wound on a reel core 437 between those flanges. By way of example, FIG. 4 shows only one turn of the winding of the clip line, the free end 439 of the turn being threaded through the connecting element 440. At their peripherally outer edge the flanges 452 and 454 have respective ridges or gripping edges 453 and 455 respectively which pass through a complementary gripping profile in the connecting element. That provides that the connecting element is safeguarded against being lost, in other words, it is captively connected to the reel body in any angular position.

The rotational body 442 has at its periphery three parallel rows of a plurality of entrainment elements 444 which are each of a different pitch. That makes it possible to use the rotational body 442 and thus the advance device for three different clip lines with correspondingly different pitches. That is of great significance in particular where the same clip machine is used for different sausage products and/or packaging materials (tubular cases, skins, bags or the like) of differing calibers and of a differing nature which in turn require different closure clip sizes. Instead of the illustrated entrainment elements in the form of pins extending in the axial direction, they can for example also be in the form of teeth on a toothed wheel.

The rotational body 442 is connected by way of a shaft stub 446 to a drive motor (not shown) of the advance device. At each of the axial edges of the rotational body 442 it has a respective plate 448, 449 which together serve as a first actuating element and transfer a holding means of the connecting element from the operative position thereof into the release position thereof in the manner described with reference to FIG. 5.

Figure 5:
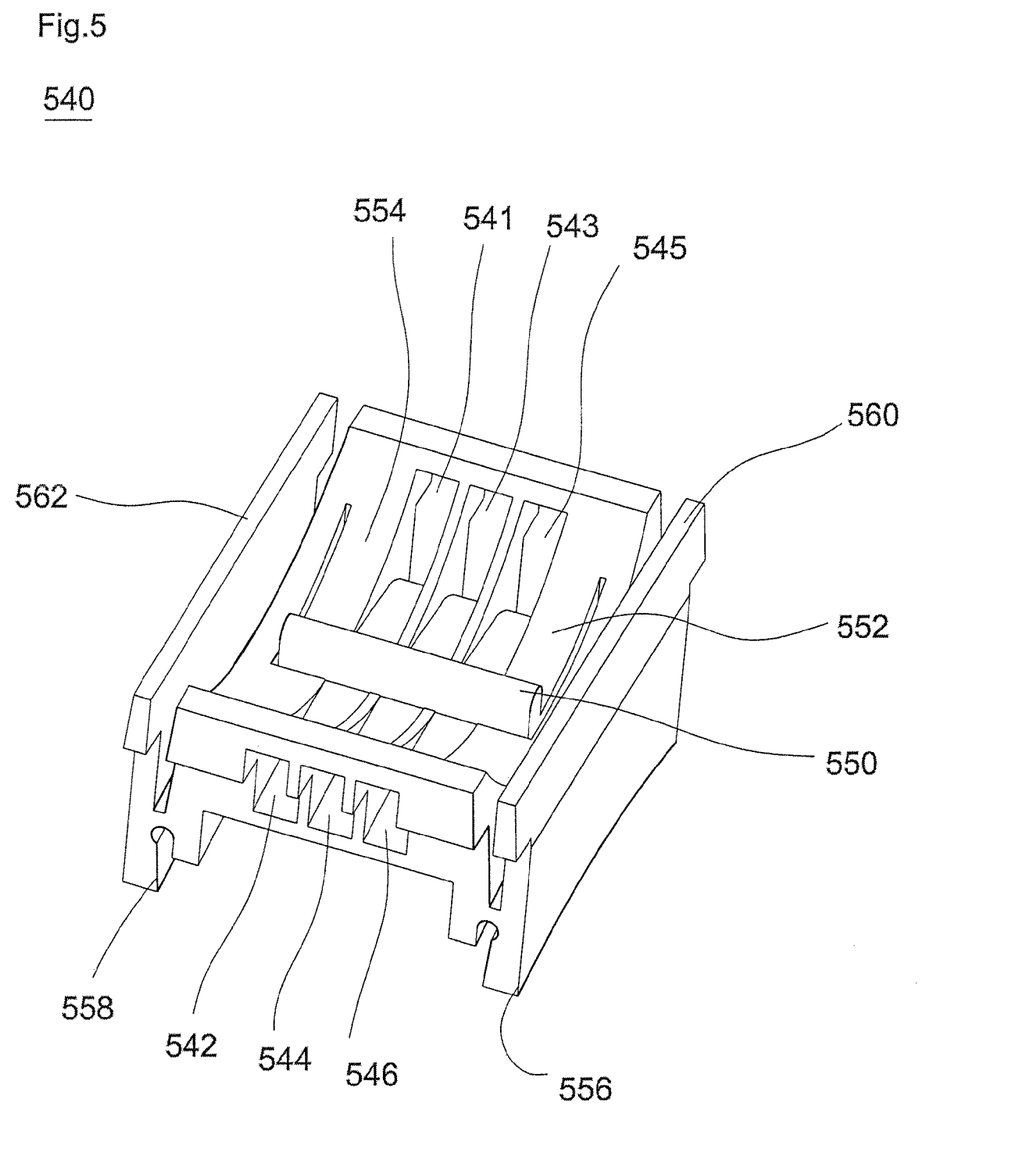
FIG. 5 shows a perspective view of an embodiment of the connecting element.

FIG. 5 is another perspective view of an embodiment of the connecting element 540. The connecting element 540 has at each of its entry and its exit three openings or windows 541 and 542, 543 and 544, 545 and 546 respectively. Those windows serve as guide means and are of a cross-section which is respectively adapted to the cross-sectional profile of an associated clip line.

If the connecting element 540 is fitted on to the reel body in the manner shown in FIG. 4, the clip line which is wound on to the reel body can be threaded with its free end through the windows which are arranged in paired opposite relationship, of suitable size. That is typically the condition in which the reel according to the invention is delivered, the number of clips projecting out of the connecting element at the free end of the clip line preferably being fixed.

When the reel is not in the operative position on or at the mounting means, as shown for example in the Figures described hereinbefore, a holding means 550 engages into an opening into the clip line of corrugated configuration. In the embodiment shown in FIG. 5 the holding means 550 is in the form of a limb which as a projection protrudes into the guide path defined by the windows 541 through 546 for the clip line within the connecting element 540.

The connecting element 540 is preferably an injection molding in which the holding means is integrally interrelatedly connected to the rest of the connecting element by way of respective bars 552 and 554 at its two ends. The bars 552 and 554 provide that the holding means 550 is suspended resiliently in the connecting element. The holding means 550 can be moved out of its illustrated operative position into a release position against the spring force applied by the natural stability of the material of the connecting element. That is effected by the limb being urged downwardly out of the guide path for the clip line.

In the case of an unwinding or feed system in accordance with the embodiment shown in FIG. 4, that is implemented by the two plates 448 and 449 of the rotational body 442 as a first actuating means, when the rotational body 442 is moved into its operative position shown in FIG. 4 and thus engages into the connecting element 440 or 540 respectively. At the same time the entrainment elements 444 take over the holding function for holding the clip line so that at no time can the clip line slip uncontrolledly out of the connecting element 540 and the clip line retains its tangential position unchanged with respect to the clip reel. Instead of mechanical transfer of the holding element from its operative position shown in FIG. 5 into the release position, it is also possible to provide that the position of the actuating element which does not necessarily have to be in the form of the plates 448 and 449 as shown in FIG. 4 is detected by sensor means and the holding means is moved driven by a motor or in some other fashion from the operative position into the release position.

Two lateral clamping jaws 556 and 558 are also provided on the connecting element 450, by virtue of elastic properties of the material involved. In the assembly situation shown in FIG. 4 with the reel body 450 the clamping jaws 556 and 558 press laterally against the respectively associated flanges 452 and 454 and thus fix the connecting element in the angular direction. That fixing is again released by means of a respective second actuating means provided on the advance device, in the region of the plates 448 and 449 respectively, insofar as that second actuating means is pressed from the outside laterally inwardly against the upper side plate portions 560, 562 and thus releases the clamping jaws 556 and 558. As the second actuating means the plates 448 and 449, in an axial prolongation of the rotational body 442, have an outer edge region which co-operates with a wedge-shaped part of the upper side plate portions 560, 562. In alternative embodiments, the transfer movement of the clamping arrangement from the operative position thereof into the release position thereof can also be controlled by the position of the second actuating element at the advance device being detected by sensor means and by the clamping arrangement being moved from its operative position into its release position driven by a motor or in some other fashion.

In accordance with the invention the connecting element therefore forms the reference element between the reel and more precisely between the clip line and the advance device, which always provides that the axial, radial and angular position of the end of the clip line is accurately defined with respect to the clip reel mounting means and thus the clip machine to which the clip reel mounting means is fixedly mounted. It is thus possible for the clip line to be automatically threaded in, unwound and fed to the lower closure tool 114 without the need for manual intervention.

With a lesser degree of automation, the invention can also be embodied in such a way that, instead of the entrainment elements which engage into the opening in the clip line, there are one or more drive rollers which bear against the clip line in frictionally locking relationship when the reel is in the operative position. With such an advance device, at least the angular position of the clip line cannot be guaranteed with the same level of certainty, because of possible slip of the drive rollers. That inaccuracy on the other hand can occur due to detection of the free end of the clip line by sensor means after the reel has been fitted to the mounting means, that is to say therefore when the reel has assumed its operative position. The sensor can be arranged for example in the form of a light barrier arrangement or the like, preferably in the region of the lower clip lever 122 near the conveyor mechanism 126 or the female die 114 and can detect the free end. The advance control means is then adapted to firstly displace the clip line by means of the entrainment elements until the sensor outputs a signal which indicates the arrival of the free end of the clip line.

In a similar manner, with a somewhat lesser degree of automation, instead of the holding means which has a projection and which engages into the opening in the clip line, it is also possible to provide on the holding means a brake which in the operative position thereof bears against the clip line in frictionally locking relationship. When such an alternative connecting element is used it is also no longer possible to determine the precise angular position of the end of the clip line with the same degree of precision as slip in respect of the brake can also lead to a displacement of the clip line. That inaccuracy can once again also be compensated by suitable sensor means.

As a departure from the embodiment illustrated for the purposes of describing the invention the entrainment element can perform an intermittently engaging pivotal movement instead of a rotary movement. The entrainment element also does not need to be driven by a motor at all, but can simply have a locking action in the form of a passive pawl mechanism in order to prevent the clip line from slipping back out of the connecting element. Then the clip line would be drawn off the reel solely by a drive in some other fashion, such as for example by the drive 126 at the lower clip lever 122. It will be noted however that the consequence of this would be that the clip line would have to be threaded through by hand at least as far as the automatic drive.

The invention claimed is:
1. A reel for a winding comprising:
a clip line having openings;
a reel body; and
a connecting element which is arranged rotatably about the reel body and captively on the reel body and which has a guide means for guiding the clip line in the unwinding operation.

2. The reel of claim 1, wherein the guide means has a notch or window adapted to the cross-section of the clip line.

3. The reel of claim 1, wherein the connecting element has a holding means engaging the clip line for holding an end of the clip line, which holding means in an operative position holds the clip line and in a release position releases the clip line for unwinding.

4. The reel of claim 3, wherein the holding means has a projection which in the operative position of the holding means engages into an opening in the clip line.

5. The reel of claim 4, wherein the holding means is held elastically by a spring force in the operative position of the holding means and can be moved against the spring force into the release position of the holding means.

6. The reel of claim 1, wherein the reel body has at least one flange on which the connecting element is arranged.

7. The reel of claim 6, wherein the connecting element has a clamping device having an operative position and a release position, with which the clamping device engages the flange in the operative position thereof, and wherein in the release position the clamping device releases the connecting element for rotation about the flange.

8. The reel of claim 6, wherein the reel body has a reel core about which the flange is at least partially rotatably supported and the connecting element is fixed to the flange.

9. The reel of claim 6, wherein the flange has a gripping edge and the connecting element has a complementary gripping profile as a safeguard against being lost.

10. The reel of claim 1, wherein the reel body has a rotatably supported carrier device to which the connecting element is fixed.

11. A system for unwinding a winding of a clip line having openings, comprising:
    a reel on which the clip line is wound, the reel comprising a reel body and a connecting element which is arranged rotatably about the reel body and captively on the reel body, which connecting element has a guide means for guiding the clip line in the unwinding operation,
    a mounting means which defines an operative position for the reel in which the reel is rotatably supported, and
    an advance device which is associated with the mounting means and which is adapted to engage the clip line in the region of the connecting element when the reel is in the operative position.

12. The system of claim 11, wherein the guide means has a notch or window adapted to the cross-section of the clip line.

13. The system of claim 11, wherein the connecting element has a holding means engaging the clip line for holding an end of the clip line, which holding means in an operative position holds the clip line and in a release position releases the clip line for unwinding, and the advance device has a first actuating means which is adapted to control transfer of the holding means from the operative position thereof into the release position thereof when the advance device engages the clip line.

14. The system of claim 13, wherein the holding means has a projection which in the operative position of the holding means engages into an opening in the clip line.

15. The system of claim 13, wherein the holding means is held elastically by a spring force in the operative position of the holding means and can be moved by the first actuating means against the spring force into the release position of the holding means.

16. The system of claim 13, wherein the advance device has at least one drive roller which bears against the clip line in frictionally locking relationship when the reel is in the operative position.

17. The system of claim 13, wherein the advance device has an entrainment element which engages into an opening in the clip line when the reel is in the operative position.

18. The system of claim 17, wherein the advance device has a rotational body on which the entrainment element is arranged.

19. The system of claim 18 further comprising a plurality of entrainment elements arranged on the rotational body at a pitch division which corresponds to a spacing of the openings along the clip line.

20. The system of claim 19, wherein the entrainment element and the first actuating means are so arranged that the entrainment element engages into the opening in the clip line while the first actuating means moves the holding means from the operative position into the release position.

21. The system of claim 11, wherein the reel body has at least one flange on which the connecting element is arranged.

22. The system of claim 21, wherein the connecting element has a clamping device having an operative position and a release position, with which the clamping device engages the flange in the operative position thereof, and wherein in the release position the clamping device releases the connecting element for rotation about the flange.

23. The system of claim 22, wherein the advance device has a second actuating means which is adapted to control transfer of the clamping device from the operative position thereof into the release position thereof when the advance device engages the clip line.

24. The system of claim 21, wherein the reel body has a reel core about which the flange is at least partially rotatably supported and the connecting element is fixed to the flange.

25. The system of claim 21, wherein the flange has a gripping edge and the connecting element a complementary gripping profile as a securing means to prevent it from being lost.

26. The system of claim 11, wherein the reel body has a rotatably supported carrier device to which the connecting element is fixed.

27. The system of claim 11, wherein the mounting means has a shaft or spindle which at least partially centrally passes through the reel in the operative position thereof.

28. The system of claim 27, wherein the shaft is motor-drivable.

29. The system of claim 11, wherein the mounting means has at least two guide rollers which in the operative position of the reel bear thereagainst in peripheral relationship.

30. The system of claim 29, wherein at least one of the guide rollers is motor-drivable.

31. The system of claim 11 further comprising a pocket associated with the mounting means in the region of the advance device, the contour of which is at least portion-wise complementary to that of the connecting element.

32. A clip machine comprising:
    a clip line having openings;
    a reel on which the clip line is wound, the reel comprising a reel body and a connecting element which is arranged rotatably about the reel body and captively on the reel body, which connecting element has a guide means for guiding the clip line in the unwinding operation,
    a mounting means which defines an operative position for the reel in which the reel is rotatably supported, and
    an advance device which is associated with the mounting means and which is adapted to engage the clip line in the region of the connecting element when the reel is in the operative position.

* * * * *